United States Patent
Kondo

(10) Patent No.: US 10,244,135 B2
(45) Date of Patent: Mar. 26, 2019

(54) IMAGE PROCESSING APPARATUS WITH A USB INTERFACE TO RESTRICT POWER DELIVERY TO AN EXTERNAL DEVICE

(71) Applicant: Brother Kogyo Kabushiki Kaisha, Nagoya-shi, Aichi-ken (JP)

(72) Inventor: Hirofumi Kondo, Ama-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/909,207

(22) Filed: Mar. 1, 2018

(65) Prior Publication Data

US 2018/0255195 A1    Sep. 6, 2018

(30) Foreign Application Priority Data

Mar. 3, 2017   (JP) .................................. 2017-040002

(51) Int. Cl.
*G06F 3/12*   (2006.01)
*H04N 1/00*   (2006.01)

(52) U.S. Cl.
CPC ..... *H04N 1/00888* (2013.01); *H04N 1/00127* (2013.01); *H04N 2201/001* (2013.01); *H04N 2201/0048* (2013.01); *H04N 2201/0072* (2013.01); *H04N 2201/0094* (2013.01)

(58) Field of Classification Search
CPC .......... H04N 1/00127; H04N 1/00885; H04N 1/00888; H04N 2201/001; H04N 2201/0048; H04N 2201/0072; H04N 2201/0094; G06F 1/26; G06F 1/266; G06F 1/3203

USPC ................................................ 358/1.1–1.18
See application file for complete search history.

(56) References Cited

U.S. PATENT DOCUMENTS

| | | | |
|---|---|---|---|
| 7,868,487 B2 * | 1/2011 | Scharnick | G05B 19/058 307/326 |
| 9,692,923 B2 | 6/2017 | Achiwa et al. | |
| 2003/0156149 A1 * | 8/2003 | Choi | B41J 2/0451 347/19 |
| 2004/0246509 A1 | 12/2004 | Hongo et al. | |
| 2008/0162955 A1 * | 7/2008 | Shimizu | G06F 1/266 713/300 |

(Continued)

FOREIGN PATENT DOCUMENTS

| JP | 2005-074945 A | 3/2005 |
|---|---|---|
| JP | 2015-174373 A | 10/2015 |

(Continued)

*Primary Examiner* — Gabriel I Garcia
(74) *Attorney, Agent, or Firm* — Banner & Witcoff, Ltd.

(57) ABSTRACT

An image processing apparatus, including an image processing unit, a controller, a power source, and a USB interface with a connector and a current detector, is provided. The controller starts delivering power to an external device through the USB interface by controlling the power source in a case where connection with the external device is detected, and, in a case where a job requiring the image processing unit to process an images is received, and in a case where a difference between a smallest value and a largest value among current values detected by the current detector within a predetermined length of time while the power is delivered to the external device exceeds a threshold value, the controller commands the USB interface to restrict power delivery to the external device.

11 Claims, 7 Drawing Sheets

(56) References Cited

U.S. PATENT DOCUMENTS

| | | | |
|---|---|---|---|
| 2012/0159228 A1* | 6/2012 | Arimoto | G03G 15/5004 |
| | | | 713/340 |
| 2012/0212778 A1* | 8/2012 | Sakai | G06K 15/402 |
| | | | 358/1.15 |
| 2015/0264208 A1 | 9/2015 | Achiwa et al. | |
| 2017/0139467 A1* | 5/2017 | Waters | G06F 1/3287 |

FOREIGN PATENT DOCUMENTS

| | | |
|---|---|---|
| JP | 2015-174375 A | 10/2015 |
| JP | 2015-176442 A | 10/2015 |

\* cited by examiner

IMAGE PROCESSING APPARATUS WITH A USB INTERFACE TO RESTRICT POWER DELIVERY TO AN EXTERNAL DEVICE

CROSS REFERENCE TO RELATED APPLICATION

This application claims priority from Japanese Patent Application No. 2017-040002, filed on Mar. 3, 2017, the entire subject matter of which is incorporated herein by reference.

BACKGROUND

Technical Field

An aspect of the present disclosure is related to an image processing apparatus, more specifically, to power delivery control in an image processing apparatus, which is connectable with an external device and is capable of delivering power to the external device.

Related Art

An image processing apparatus, which is connectable with an external device through an interface and capable of delivering power to the external device through the interface, is known. The image processing apparatus may process an image and print the image on a sheet. The image processing apparatus may stop the power delivery to the external device when the image processing apparatus prints the image and resume the power delivery to the external device when printing of the image is completed.

SUMMARY

If the image processing apparatus stops the power delivery to the external device each time an image is printed, usage of the external device may be limited. Meanwhile, if the image processing apparatus continuously delivers the power to the external device even when printing an image, current in the power to be distributed to the external device may cause fluctuation in voltage in the image processing apparatus. Therefore, the voltage required to process the image may be unstable, and the unstable voltage may affect a quality of the image being processed undesirably.

The present disclosure is advantageous in that an image processing apparatus, which may deliver power to an external device connected thereto while an image processing quality may be restrained from being lowered, is provided.

According to an aspect of the present disclosure, an image processing apparatus, having an image processing unit configured to process an image, a controller, a power source, and a USB interface, is provided. The USB interface includes a connector and a current detector configured to detect current flowing in a power line. The connector is connectable with an external device. The power line connects the connector with the power source. The controller is configured to start delivering power to the external device through the USB interface by controlling the power source in a case where connection with the external device through the connector is detected; and, in a case where the controller receives a job requiring the image processing unit to process the image, and in a case where a difference between a smallest value and a largest value among current values detected by the current detector within a predetermined length of time while the power is delivered to the external device exceeds a threshold value, command the USB interface to restrict power delivery to the external device.

According to another aspect of the present disclosure, an image processing apparatus, having an image processing unit configured to process an image, a controller, a power source, and a USB interface, is provided. The USB interface includes a connector and a current detector configured to detect current flowing in a power line. The connector is connectable with an external device. The power line connects the connector with the power source. The controller is configured to start delivering power to the external device through the USB interface by controlling the power source in a case where connection with the external device through the connector is detected; in a case where the controller receives a job requiring the image processing unit to process the image, count a number of times that a difference between a smallest value and a largest value among current values detected by the current detector within a predetermined length of time while the power is delivered to the external device exceeds a threshold number; and in a case where the counted number exceeds the threshold number, command the USB interface to restrict power delivery to the external device.

BRIEF DESCRIPTION OF THE ACCOMPANYING DRAWINGS

DETAILED DESCRIPTION

Hereinafter, described will be embodiments of the present disclosure with reference to the accompanying drawings.

Figure 1:
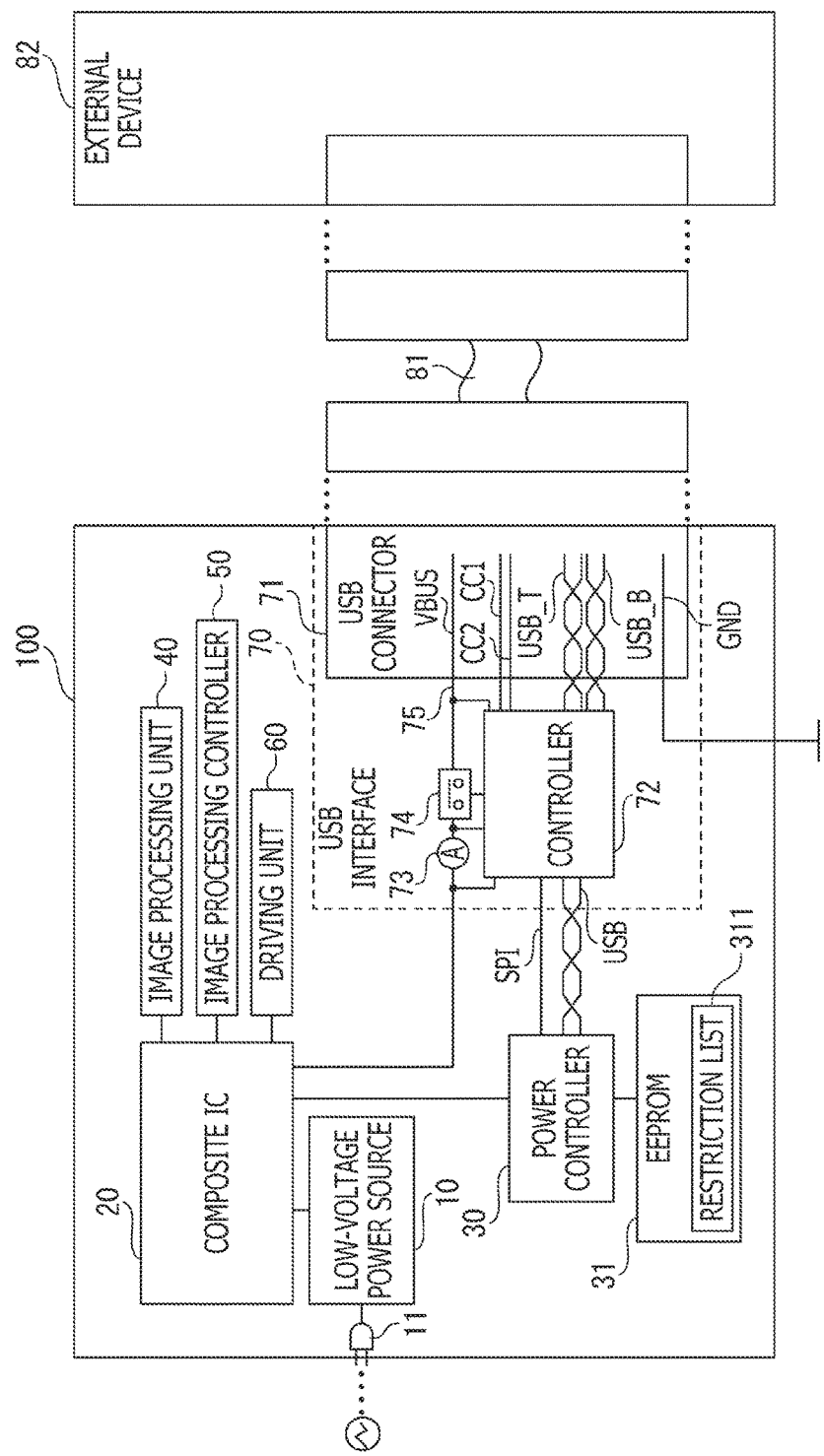
FIG. 1 illustrates an electrical configuration of an image processing apparatus according to a first embodiment of the present disclosure.

In a first embodiment, an image processing apparatus 100 having a Universal Serial Bus-Power Delivery (USB-PD) port will be described. The image processing apparatus 100 includes, as shown in FIG. 1, a low-voltage power source 10, a composite IC 20, a power controller 30, an image processing unit 40, an image processing controller 50, a driving unit 60, and a USB interface 70. The low-voltage power source 10 is connected with a power plug 11.

The low-voltage power source 10 may convert power supplied externally from a commercial power supplier into direct-current (DC) low-voltage power and supply the converted power to the composite IC 20. The composite IC 20 may convert voltages of the power supplied from the low-voltage power source 10 and distribute the voltage-converted power to the image processing unit 40, the image processing controller 50, the driving unit 60, and the USB interface 70.

The image processing unit 40 may process images in order to, for example, print an image on a sheet in one of known printing technics, which includes inkjet printing and electro-photographic printing. The image may be input to the image processing apparatus 100 by, for example, reading an image from an original. The image processing controller 50 may control the image processing unit 40 based on, for example, a command from a user to process the image. The driving unit 60 may include, for example, a motor and may drive movable parts in the image processing apparatus 100 and switch driving gears.

The USB interface 70 may establish communication between the image processing apparatus 1 and an external device 82, which is connected to the image processing apparatus 100 through a USB cable 81. The USB interface 70 includes a connector 71, a controller 72, a current detector 73, a switch 74, and a power line 75. The controller 72 is controlled by the power controller 30 to control power delivery to the external device 82 through the connector 71.

The power line 75 interconnects the composite IC 20 with power pins (unsigned) in the connector 71. When the image processing apparatus 100 delivers power to the external device 82 through the connector 71, a current flows through the power line 75, and the current detector 73 may detect strength of the current flowing in the power line 75. The switch 74 may connect or disconnect the power line 75 between the current detector 73 and the connector 71. The controller 72 may control the switch 74 to control the power delivery.

The USB interface 70 in the image processing apparatus 100 complies with a USB-PD standard. The USB cable 81 and the external device 82 referred to in the present disclosure comply with the USB-PD standard. Therefore, the image processing apparatus 100 is enabled to share power with the external device 82 connected thereto through the USB cable 81 in compliance with the USB-PD standard.

The power controller 30 may include, for example, an ASIC and may control the USB interface 70 to deliver power to the external device 82. Optionally, the image processing controller 50 may control the power controller 30.

The power controller 30 is connected with an EEPROM 31. The EEPROM 31 is a non-volatile memory device and stores a restriction list 311, which contains information regarding power delivery through the image processing apparatus 100. The restriction list 311 will be described later in detail.

When the external device 82 is attached to the connector 71 while the image processing apparatus 100 is being powered by the commercial power through the power plug 11, the image processing apparatus 100 may deliver the power to the external device 82 connected thereto. According to the USB-PD standard, when devices are connected with each other through the connector 71, the devices negotiate to determine a direction of power delivery and an amount of the power to be delivered.

During the negotiation, for example, the image processing apparatus 100 may send profiles containing power information regarding a maximum amount of the power that may be delivered to the external device 82. The profiles may contain, for example, combinations of voltage values and maximum current values. The external device 82 receiving the profiles may select one of the profiles that may satisfy a combination of a voltage value and a current value that the external device 82 requests and notify the image processing apparatus 100 of the selected one of the profiles. The image processing apparatus 100 may receive the information indicating the maximum power amount requested by the external device 82 within the profiles from the external device 82 through the connector 71.

The image processing apparatus 100 may, further, send a signal to the external device 82 in response to the request indicating, for example, acceptance or denial of the request. If the image processing apparatus 100 accepts the request, the image processing apparatus 100 may start delivering the power to the external device 82 up to the maximum amount indicated in the information received from the external device 82. Once the image processing apparatus 100 starts delivering the power to the external device 82, the image processing apparatus 100 may still renegotiate with the external device 82 to change the profiles and/or stop delivering the power.

Meanwhile, devices interconnected through a USB interface may exchange data indicating types of the devices. Specifically, when the image processing apparatus 100 detects a signal indicating that the USB cable 81 is attached to the connector 71, the image processing apparatus 100 exchanges data with the connected external device 82 to obtain identifying information, including vendor ID (VID) and product ID (PID), from the external device 82. Alternately, the image processing apparatus 100 may obtain the identifying information from the external device 82 through the negotiation.

Next, described below will be power delivery control in the image processing apparatus 100. The image processing apparatus 100 may deliver power of at most, for example, 20V*5 A for 100 W. Current values of the power to flow in the power line 75 in the USB interface 70 of the image processing apparatus 100 may fluctuate depending on a condition of the external device 82 to be powered. The current values may fluctuate depending on, for example, a task to be processed in the external device 82. Meanwhile, a width of a fluctuation range for the current values of the power may depend on a type or a model of the external device 82.

Acute changes of the current values in the power to be delivered to the external device 82 may cause noise in output voltage from the low-voltage power source 10 in the image processing apparatus 100. Therefore, for example, if the output voltage from the low-voltage power source 10 fluctuates while the image processing apparatus 100 is conducting a job that includes an imaging process such as printing, a quality of the output image may be affected by the unstable output voltage. In this regard, the image processing apparatus 100 may restrict the power delivery to the external device 82, which may cause the acute change in the current values, while the image processing apparatus 100 is conducting the imaging process so that the influence on the imaging process may be restrained or reduced.

When the image processing apparatus 100 starts delivering power to the external device 82 connected thereto through the connector 71, the image processing apparatus 100 detects the current value of the power flowing in the power line 75 and obtains a range of fluctuation in the detected current values. The image processing apparatus 100 may detect the current values when the image processing apparatus 100 is released from the imaging process. For the range of fluctuation of the current values, the image processing apparatus 100 may calculate a difference between a smallest current value and a largest current value detected within a predetermine length of time.

If the calculated difference is greater than a predetermined threshold value, the image processing apparatus 100 determines that the external device 82 may affect the quality of the image undesirably if the power is delivered to the external device 82 while conducting an imaging process. For example, power delivery to the external device 82, in which the difference in the current values in 0.05 ms is greater than 2 A, may cause undesirable influence on the quality of the image being processed. In this regard, the image processing apparatus 100 may restrict the power delivery to the external device 82 when the image processing apparatus 100 receives a job that requires an imaging process.

Figure 2:
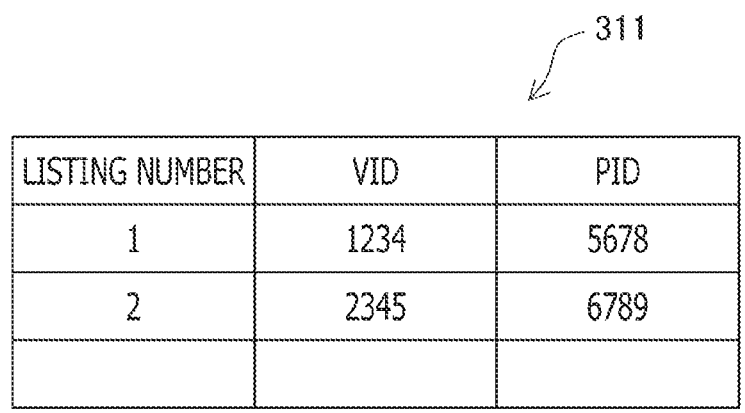
FIG. 2 illustrates a restriction list to be referred to in the image processing apparatus according to the first embodiment of the present disclosure.

In this regard, the image processing apparatus 100 stores a restriction list 311 (see FIG. 2) containing information of the external device 82, to which the power delivery should be restricted during an imaging process, in the EEPROM 31. As shown in the example of FIG. 2, the restriction list 311 to be stored in the EEPROM 31 may contain the identifying information, including combinations of the VID and the PID, of the external device 82.

As mentioned earlier, the image processing apparatus 100 has the identifying information of the external device 82 obtained through the data exchange with the external device 82 connected through the connector 71. Therefore, the image processing apparatus 100 may write the obtained identifying information of the external data 82, having the greater difference in the current values, in the restriction list 311. Based on the identifying information written in the restriction list 311, the image processing apparatus 100 may restrict power delivery to the external device 82 in the list during the imaging process.

Next, with reference to FIG. 3, described below will be a power delivery controlling process to control the power delivery to the external device 82. The power delivery controlling process may be activated, while the image processing apparatus 100 is electrically connected with the commercial power source through the power plug 11, in response to a powering action to the image processing apparatus 100. The image processing apparatus 100 may process an image to print the image, and in the following description, a printing process as an example of the imaging process will be described with reference to FIG. 4.

As the power delivery controlling process starts, in S101, the power controller 30 determines whether connection with the external device 82 is detected. If the power controller 30 determines that the connection with the external device 82 is detected (S101: YES), in S102, the power controller 30 determines whether a request for power delivery from the connected external device 82 is accepted. In other words, the power controller 30 determines whether a signal from the external device 82 requesting for power delivery is received.

If the power controller 30 determines that the request for power delivery is received (S102: YES), in S103, the power controller 30 starts delivering power to the external device 82 through the USB interface 70. Prior to starting delivering power to the external device 28, the image processing apparatus 100 negotiates with the external device 82 over the amount of the power to be delivered. When the amount of the power to be delivered is agreed between the image processing apparatus 100 and the external device 82, the power controller 30 commands the composite IC 20 to output the power and controls the USB interface 70 to deliver the power in the agreed power amount to the external device 82.

In S104, the power controller 30 determines whether the external device 82 detected in S101 is an external device 82 under restriction. In particular, based on the identifying information of the external device 82 obtained through the communication with the external device 28, the power controller 30 refers to the restriction list 311 stored in the EEPROM 1 and determines whether the identifying information obtained from the connected external device 82 is contained in the restriction list 311. If the identifying information of the connected external device 82 is not contained in the restriction list 311 (S104: NO), in S105, the power controller 30 starts a device determining process (see FIG. 5).

In the device determining process, the power controller 30 may determine whether the external device 82 is under the restriction, and if the power controller 30 determines that the external device 82 is under the restriction, the power controller 30 may write the identifying information of the external device 82 in the restriction list 311. The power controller 30 may execute the device determining process in parallel with the power delivery controlling process. The device determining process will be described later in detail.

Meanwhile, when the connected external device 82 is determined to be under the restriction, and if the identifying information of the external device 82 is contained in the restriction list 311 (S104: YES), the power controller 30 proceeds from S104 to S106 without conducting the device determining process in S105. In other words, if the power controller 30 determines that the current values in the connected external device 82 may fluctuate in a large range while the power is delivered to the external device 82, the power controller 30 may avoid the device determining process so that a processing load on the power controller 30 may be reduced.

In S101-S106, if no external device 82 is detected in S101 (S101: NO); no request for power delivery is accepted in S102 (S102: NO); the identifying information of the connected external device 82 is contained in the restriction list 311 in S104 (S104: YES); or after starting the device determining process in S105; in S106, the power controller 30 determines whether a print job is received.

If the power controller 30 determines that a print job is received (S106: YES), in S107, the power controller 30 executes a printing process, which will be described below with reference to FIG. 4.

As the printing process starts, in S201, the power controller 30 determines whether the power is being delivered to the external device 82, which is under the power delivery restriction. In particular, the power controller 30 determines whether the power is being delivered to the external device 82 and whether the identifying information of the external device 82 to which the power is being delivered is contained in the restriction list 311 in the EEPROM 31.

If the power is being delivered to the external device 82 under the power delivery restriction (S201: YES), the power controller 30 commands the USB interface 70 to restrict the power delivery to the external device 82. In particular, in S202, the power controller 30 controls the USB interface 70 to alert the external device 82 that the power delivery will be restricted and, in S203, to restrict the power delivery to the external device 82. For example, the power controller 30 may control the USB interface 70 to transmit a signal to the external device 82 indicating that the power delivery will be discontinued and to disconnect the switch 71 to stop the power to the external device 82. The power controller 30 may store information indicating that the power delivery to the external device 82 is restricted in a memory device (e.g., the EEPROM 31).

Following S203, or if the external device 82 to which the power is being delivered is not under the power delivery restriction (S201: NO), in S204, the power controller 30 prints an image for the received print job. In this regard, when the power is not being delivered to the external device 82, or when the external device 82 to which the power is being delivered is not under the power delivery restriction, the power controller 30 may not command the USB interface 70 to restrict the power delivery.

Meanwhile, in S205, while image printing for the print job is being conducted, the power controller 30 determines whether connection with an external device 82 is detected. If connection with an external device 82 is detected (S205: YES), in S206, the power controller 30 determines whether a request for power delivery from the connected external device 82 is accepted.

If the power controller 30 determines that the request for power delivery is accepted (S206: YES), in S207, the power controller 30 determines whether the external device 82 detected in S205 is an external device 82 under the power delivery restriction. S207 may be conducted in the same manner as S104 in the power delivery controlling process (see FIG. 3). If the connected external device 82 is determined to be under the power delivery restriction (S207: YES), in S208, the power controller 30 controls the USB interface 70 to alert the external device 82 that the power delivery to the external device 82 will be restricted. Thus, the power controller 30 does not start power delivery to the connected external device 82. For example, the power controller 30 may control the USB interface 70 to transmit a signal to the external device 82 indicating that the power will not be delivered. The power controller 30 may store information indicating that the power delivery to the external device 82 is restricted in a memory device (e.g., the EEPROM 31).

Meanwhile, if the power controller 30 determines that the connected external device 82 is not under the power delivery restriction (S207: NO), in S211, the power controller 30 starts delivering power to the external device 82. In particular, in the same manner as S103 in the power delivery controlling process, the power controller 30 negotiates with the external device 82 over the amount of the power to be delivered, and when agreed with the external device 82, the power controller 30 starts delivering power to the external device 82. In S212, the power controller 30 starts the device determining process, which is conducted in the same manner as the device determining process in S105 in the power delivery controlling process.

In S205-S212, if no external device 82 is detected in S205 (S205: NO); no request for power delivery is accepted in S206 (S206: NO); or following S208 or S212, in S215, the power controller 30 determines whether image printing for the print job is completed. If the image printing for the print job is not completed (S215: NO), the power controller 30 returns to S201 and determines whether the power is being delivered to the external device 82, which is under the power delivery restriction.

For example, the external device 82 may be connected to the image processing apparatus 100 for the first time, and at the instant of the first connection, the external device 82 may not be under the power delivery restriction. However, through the device determining process starting in S212, the external device 82 may be determined to be under the power delivery restriction. In such a case, the identifying information of the external device 82 may be stored in the restriction list 311. Therefore, if the identifying information of the external device 82 is stored in the restriction list 311 before image printing for the print job is completed, the power controller 30 may determine in S201 that the external device 82 being powered is under the power delivery restriction. Accordingly, power delivery to the external device 82 may be restricted from then onward.

In S215, if image printing for the print job is completed (S215: YES), in S216, the power controller 30 determines whether the power delivery to the external device 82 has been restricted, based on the information indicating that the power delivery to the external device 82 has been restricted stored, or not stored, in the memory device. If the power delivery to the external device 82 has been restricted (S216: YES), in S217, the power controller 30 notifies the external device 82 that the power delivery restriction on the external device 82 will be removed. For example, the power controller 30 may control the USB interface 70 and transmit a signal, indicating that the power delivery will be resumed, to the external device 82.

In S218, the power controller 30 controls the USB interface 70 to resume the power delivery to the external device 82. In particular, in the same manner as S103 in the power delivery controlling process, the power controller 30 negotiates with the external device 82 over the amount of the power to be delivered, and when agreed with the external device 82, the power controller 30 commands the composite IC 20 to output the power and control the USB interface 70 to deliver the power in the agreed power amount to the external device 82. Thus, after completion of an imaging process, e.g., a printing process, prompt recovery of the power delivery to the external device 82 may enable the external device 82 to be operable earlier. Following S218, or if the power delivery to the external device 82 has not been restricted (S216: NO), the power controller 30 ends the printing process and returns to the power delivery controlling process (see FIG. 3).

Figure 3:
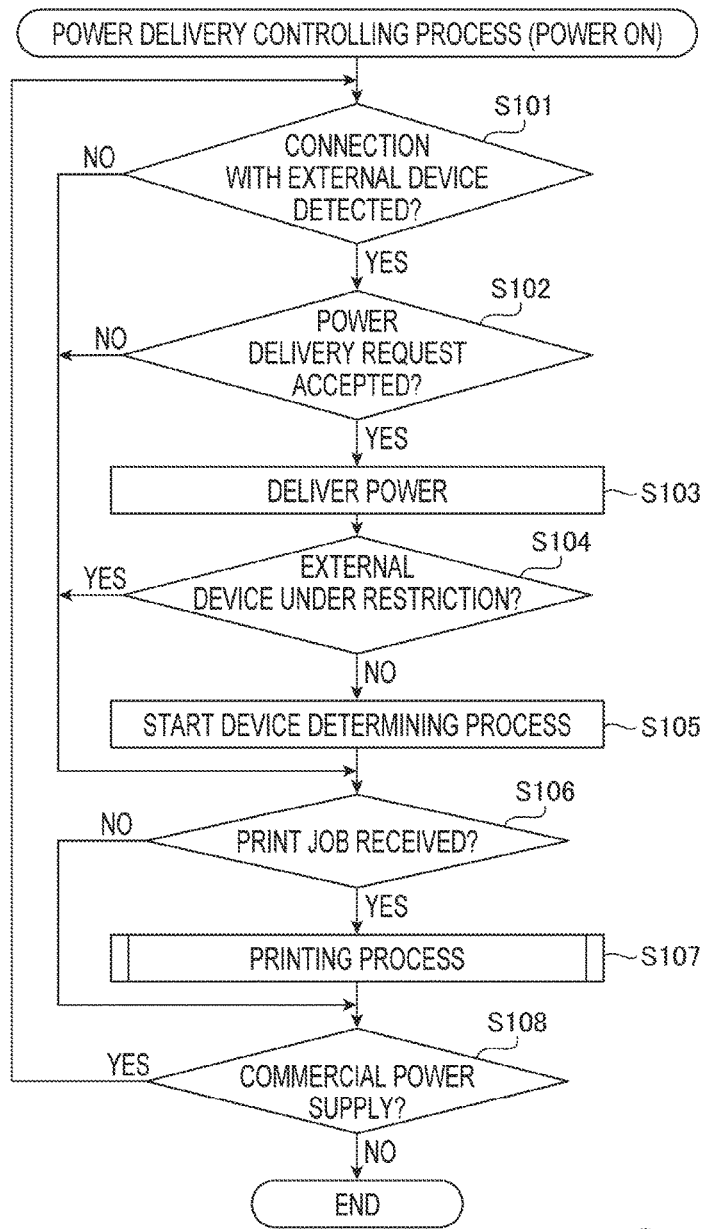
FIG. 3 is a flowchart to illustrate a flow of steps in a power delivery controlling process according to the first embodiment of the present disclosure.
Figure 4:
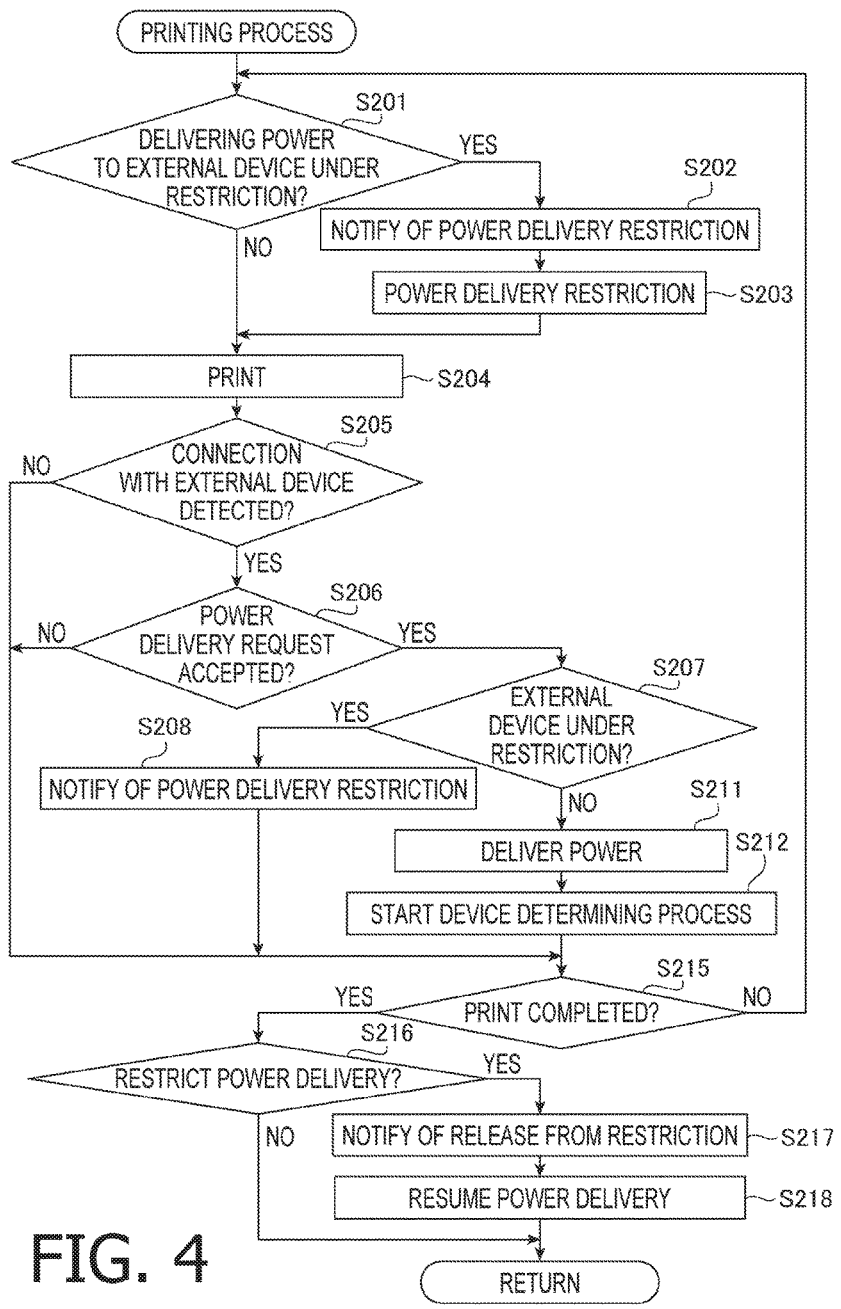
FIG. 4 is a flowchart to illustrate a flow of steps in a printing process according to the first embodiment of the present disclosure.

Returning to the power delivery controlling process shown in FIG. 3, following S107, or if the power controller 30 determines that no print job is received (S106: NO), in S108, the power controller 30 determines whether the power from the commercial power source is continuously delivered. If the power controller 30 determines that the power is continuously delivered (S108: YES), the power controller 30 returns to S101 and stands by for connection with a new external device 82 and for a new print job.

If the power from the commercial power source is discontinued, or if the image processing apparatus 100 is powered off (S108: NO), the power controller 30 ends the power delivery controlling process. Meanwhile, the power from the commercial power source may be discontinued, or the image processing apparatus 100 may be powered off at other timing than S108 while the image processing apparatus 100 is conducting a process. In such an occasion, the process being conducted by the power controller 30 may be terminated.

Figure 5:
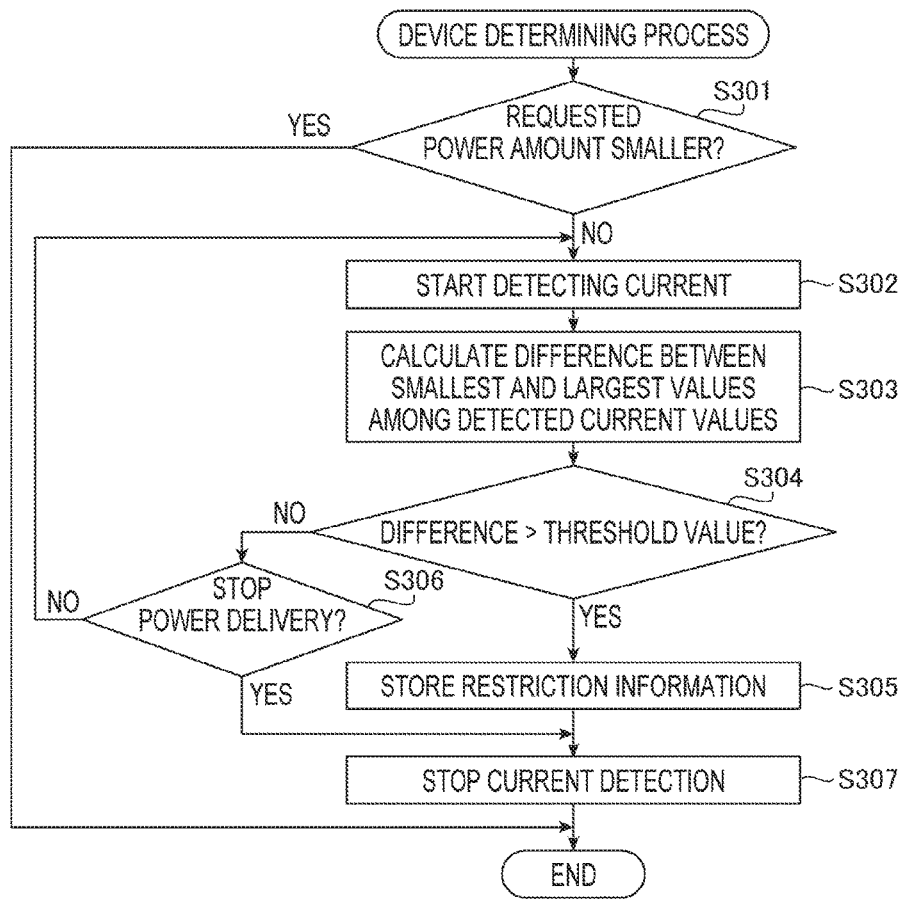
FIG. 5 is a flowchart to illustrate a flow of steps in a device determining process according to the first embodiment of the present disclosure.

Next, with reference to FIG. 5, described below will be the device determining process in the image processing apparatus 100. The device determining process may be conducted in S105 in the power delivery controlling process and in S212 in the printing process.

As the device determining process starts, in S301, the power controller 30 determines whether the amount of the power requested by the external device 82, which is agreed with the external device 82 in the negotiation within the power delivery controlling process, is smaller than a predetermined threshold value. If the amount of the power requested by the external device 82 is determined to be smaller than the predetermined threshold value (S301: YES), the power controller 30 ends the device determining process. When the amount of the power to be delivered to the external device 82 is smaller, a fluctuation range for the current values may be smaller, and the fluctuation may not notably affect the quality of the image being processed. Therefore, the power controller 30 may end the device determining process so that a processing load on the power controller 30 may be reduced.

The threshold value for the power amount may be, for example, 2.5 W. For example, a voltage value requested by the external device 82 may be 5V, a maximum current value requested by the external device 82 may be smaller than 0.5 A. In this regard, the power amount requested by the external device 82 may be smaller than 2.5 W. If the requested power amount is smaller than 2.5 W, it may be unlikely that fluctuation in the current values notably affects the quality of the image being printed even if the printing is processed while the power is being delivered to the external device 82. In this regard, the image processing apparatus 100 may not restrict the power delivery to the external device 82, which requests the power amount of 2.5 W or smaller, even while image printing is being conducted. Therefore, the power controller 30 does not write the identifying information of the external device 92, when the power amount requested by the external device 82 is smaller, in the restriction list 311.

If the amount of the power requested by the external device 82 is determined not to be smaller than the predetermined threshold value (S301: NO), in S302, the power controller 30 starts detecting the current in the power line 75. The power controller 30 may receive signals corresponding to the values of the current flowing in the power line 75 from the current detector 73 and samples the current values at a predetermined interval. Thus, the power controller 30 may obtain the values of the current flowing in the power line 75 at each sampling point based on the sampled signals.

In S303, the power controller 30 calculates a difference between a smallest value and a largest value among a predetermined number of the current values obtained consecutively through the current detector 73. Thus, the current values may be sampled within a predetermined length of time, and the difference between the smallest value and the largest value among the predetermined number of current values may indicate a range of fluctuation for the current values within the predetermined length of time. Alternatively, the USB interface 70 may sample the current values and calculate the difference between the smallest value and the largest value and pass the calculated result to the power controller 30.

In S304, the power controller 30 determines whether the calculated difference is greater than the predetermined threshold value. The threshold value may be a fixed value or may be a ratio of the difference with respect to the amount of the power or the current value.

Figure 6:
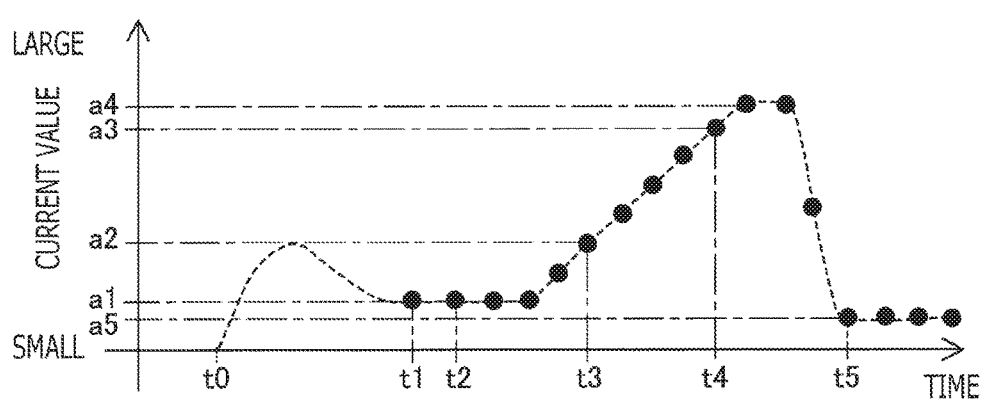
FIG. 6 is a graph to illustrate fluctuation of current values in the image processing apparatus according to the first embodiment of the present disclosure.

FIG. 6 illustrates fluctuation of the current values. As shown in FIG. 6, the image processing apparatus 100 starts delivering the power to the external device 82 at timing t0 and starts sampling the current values at timing t1. A horizontal axis and a vertical axis in FIG. 6 indicate elapsing time and current values, respectively. Dots in FIG. 6 indicate sampled current values. A distance between the dots along the horizontal axis indicates a predetermined interval, which may be, for example, 10 μs. For example, if the predetermined number to sample the current values is five (5), the power controller 30 may calculate a difference between a smallest value and a largest value within five consecutively sampled current values represented in five adjoining dots in FIG. 6.

In S304, if the calculated difference is greater than the predetermined threshold value (S304: YES), in S305, the power controller 30 stores restriction information in association with the identifying information of the external device 82, to which the power is being delivered. In particular, the power controller 30 may store the identifying information of the external device 82, to which the power is being delivered, in the restriction list 311 stored in the EEPROM 31.

If the calculated difference is not greater than the predetermined threshold value (S304: NO), in S306, the power controller 30 determines whether the power delivery to the external device 82 has been discontinued. For example, when the USB cable 81 is removed from the connector 71, or when the power to the external device 82 is blocked, the power delivery to the external device 82 may be discontinued. If the power delivery has not been discontinued but is continued (S306: NO), the power controller 30 returns to S302 and continues to detect the current values.

As shown in FIG. 6, for example, a different calculated on basis of five points ranging between timing t2 and timing t3 may be described as (a2–a1); a difference calculated on basis of another five points ranging between timing t3 and timing t4 may be (a3–a2); and a difference calculated on basis of another five points ranging between timing t4 and timing t5 may be (a4–a5). When, for example, the predetermined threshold is a value greater than (a3–a2) and smaller than (a4–a5), the different should not increase to be larger than the threshold value until timing t4. Therefore, the power controller 30 may determine in S304 that the calculated difference is not greater than the predetermined threshold value (S304: NO) and continues detecting the current values. Meanwhile, the power controller 30 may determine that the difference increased to be larger than the threshold value based on the result taken by timing t5. Therefore, based on the determination, the power controller 30 may store the identifying information of the external device 82 in the restriction list 311.

Following S305, or if the power delivery to the external device 82 has been discontinued (S306: YES), in S307, the power controller 30 terminates detection of the current values and ends the device determining process. Thus, the power controller 30 may calculate the difference in the current values detected by the current detector 73 while the power is being delivered to the external device 82, and when the calculated difference stays smaller than the threshold value, the power controller 30 may continue detecting the current values. When the calculated values increased to be larger than the threshold value, the power controller 30 may store the identifying information of the external device 82 in the restriction list 311 and end detecting the current values.

While the image processing apparatus 100 is connected with the external device 82, in which the current values may fluctuate in the large range, it may be anticipated that the quality of the image being processed may be lowered. In this regard, according to the image processing apparatus 100 in the present embodiment, when a difference between a smallest current value and a largest current value detected by the current detector 73 within a predetermined length of time while the image processing apparatus 100 is delivering power to the external device 82 exceeds the threshold value, the external device 82 may be determined to be a device, in which the fluctuation range of the current values is large. In this regard, the image processing apparatus 100 may restrict delivery of the power to the external device 82, in which the fluctuation range of the current values is large, when the image processing apparatus 100 receives a job that requires the image processing unit 40 to conduct an imaging process while delivering the power to the external device 82 so that the quality of the image to be processed may be prevented from being lowered. On the other hand, if the external device 82 is a device, in which the current values may fluctuate in a smaller range, the quality of the image being processed may not likely be lowered due to the power delivery to the external device 82; therefore, delivery of the power to the external device 82 may not be restricted but may be continued. In other words, the image processing apparatus 100 may continuously deliver the power to the external device 82 even after receiving the job. Thus, the quality of the image may be prevented from being lowered while benefit of the power delivery to the external device 82 may be maintained.

Figure 7:
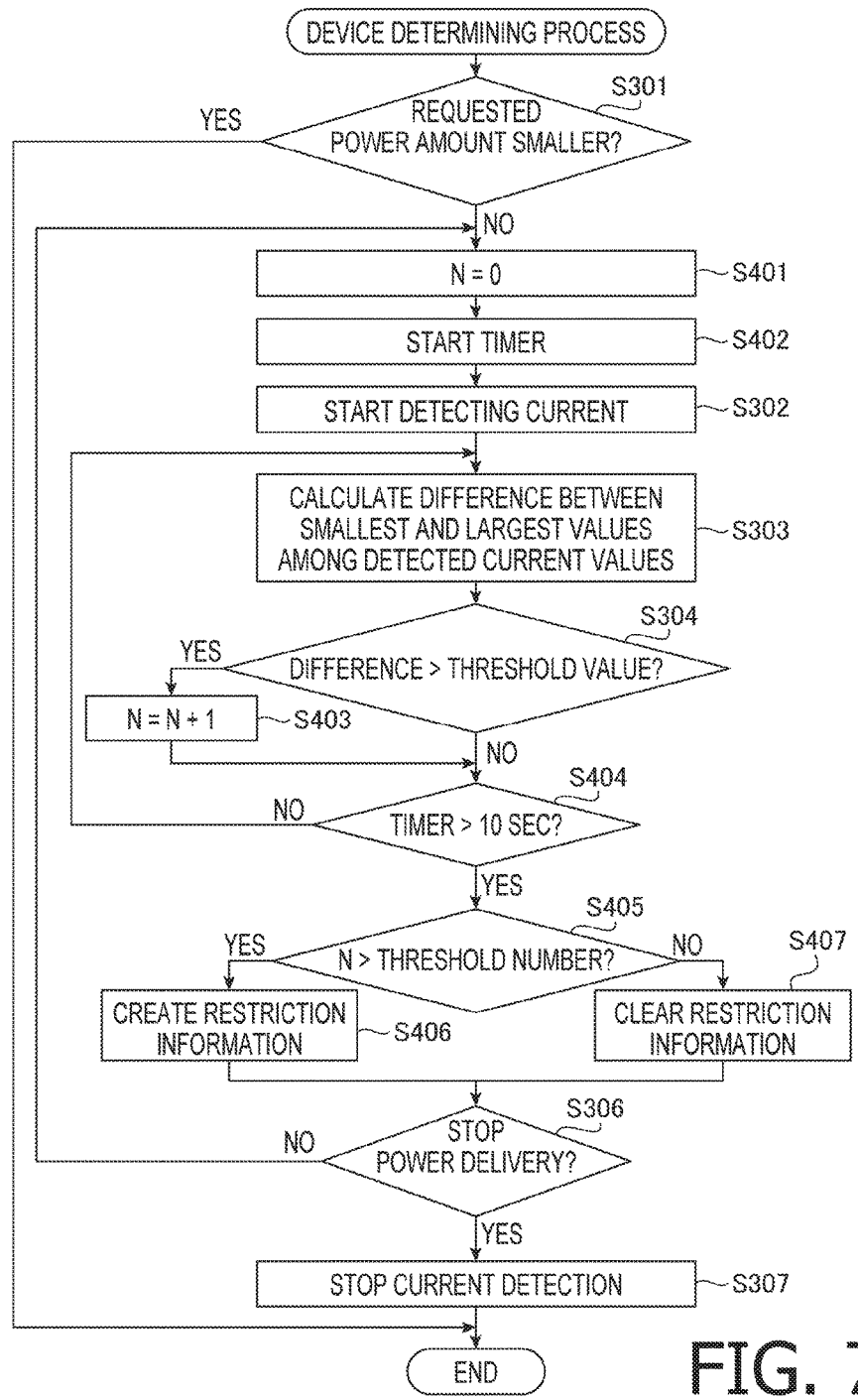
FIG. 7 is a flowchart to illustrate another flow of steps in the device determining process according to a second embodiment of the present disclosure.

Next, with reference to FIG. 7, described below will be a second embodiment of the present disclosure. In the following description, items or structures which are substantially the same as or similar to those described in the first embodiment may be denoted by the same reference signs, and description of those may be omitted.

The image processing apparatus 100 may execute the power delivery controlling process (FIG. 3) and the printing process (FIG. 4) as described in the first embodiment. Meanwhile, the device determining process (FIG. 7) may be different from the device determining process (FIG. 4) described above in the first embodiment.

In particular, as the device determining process starts, in S301, the power controller 30 determines whether the amount of the power requested from the external device 82 is smaller than the predetermined amount. If the power mount requested from the external device 82 is smaller (S301: YES), the power controller 30 ends the device determining process.

If the power amount requested from the external device 82 is not smaller than the predetermined amount (S301: NO), in S401, the power controller 30 resets a number N in a counter, which will be described later in detail. In S402, the power controller 30 clears and starts a timer. In S302, the power controller 30 starts detecting the current in the power line 75, similarly to S302 in the device determining process in the first embodiment.

In S303, the power controller 30 calculates a difference between a smallest value and a largest value among the predetermined number of the current values obtained consecutively. In S304, the power controller 30 determines whether the calculated difference is greater than the predetermined threshold value. The threshold value may or may not be the same value as the threshold value in the first embodiment.

In S304, if the calculated difference is greater than the predetermined threshold value (S304: YES), in S403, the power controller 30 increments the number N by one (1). Following S403, or if the difference calculate in S303 is not greater than the predetermined threshold value (S304: NO), in S404, the power controller 30 determines whether a length of the time measured by the timer started in S402 exceeded for a predetermined length, which may be, for example, 10 seconds.

If the length of the measured time has not exceeded 10 seconds (S404: NO), the power controller 30 returns to S303 and calculates a difference between a smallest value and a largest value among the predetermined number of the current values obtained consecutively. If the length of the measured time has exceeded 10 seconds (S404: YES), in S405, the power controller 30 determines whether the number N has exceeded a predetermined number. In this regard, the number N indicates a number of times in every 10 seconds that the difference between the smallest value and the largest value among the predetermined number of the current values exceeded the threshold value. The predetermined number may be, for example, two (2) or larger.

If the length of the measured time has exceeded 10 seconds (S404: YES), in S406, the power controller 30 creates restriction information. In particular, the power controller 30 stores the identifying information of the external device 82, to which the power is being delivered, in the restriction list 311 in the EEPROM 31. If the identifying information is already contained in the restriction list 311, the power controller 30 skips S406 and proceeds to S306.

In S405, if the power controller 30 determines that the number N has not exceeded the predetermined number (S405: NO), in S407, the power controller 30 clears the restriction information. In particular, the power controller 30 deletes the identifying information of the external device 82, to which the power is being delivered, from the restriction list 311 in the EEPROM 31. If no identifying information of the external device 83 is contained in the restriction list 311, the power controller 30 skips S407 and proceeds to S306.

Following S406 or S407, in S306, the power controller 30 determines whether the power delivery to the external device 82 has been discontinued. If the power delivery has not been discontinued but is continued (S306: NO), the power controller 30 returns to S401 and resets to start counting the number N in the counter, which indicates the number of times in every 10 seconds that the difference between the smallest value and the largest value among the predetermined number of the current values exceeded the threshold value. If the power delivery to the external device 82 has been discontinued (S306: YES), in S307, the power controller 30 stops detecting the current values and ends the device determining process.

According to the device determining process in the second embodiment, the power controller 30 may continue detecting the current values while delivering the power to the external device 82. While delivering the power to the external device 82, the power controller 30 counts the number N of times that the difference in the current values detected by the current detector 73 exceeded within the predetermined length of time. When the number N exceeds the threshold number, the power controller 30 stores the identifying information of the external device 82 in the restriction list 311. Therefore, for example, incidental fluctuation of the current values due to electrical noise may be eliminated from consideration. Further, the power controller 30 may, while the number N does not exceed but stays within the threshold number, remove the identifying information of the external device 82 from the restriction list 311. Therefore, for example, due to changes in conditions in the external device 82 or changes in usage of in the external device 82, if restriction of the power delivery to the external device 82 becomes no longer necessary, the power delivery to the external device 82 may be resumed. Thus, efficiency in the power delivery to the external device 82 may be improved.

As described above, the image processing apparatus 100 in the second embodiment may count the number of times that the difference between the smallest value and the largest value among the current values detected by the current detector 73 exceeded within the predetermined time period. When the number N exceeds the threshold number, the external device 82 may be determined to be a device, which may operate in the larger fluctuation range for the current values. According to the second embodiment, a larger number of current values may be sampled compared to a number (e.g., 5) of current values sampled in the first embodiment. Therefore, influence of an irregular factor, such as electrical noise, on the current values may be reduced, and the power controller 30 may determine whether the power delivery to the external device 82 should be restricted or continued more accurately. On the other hand, in the first embodiment, power delivery to the external device 82 may be controlled based on the less complicated flow and determinations.

Meanwhile, in the second embodiment, the power controller 30 may conduct the device determining process to the external device 82, which is under the power delivery restriction with the identifying information thereof being contained in the restriction list 311. In particular, S104 (see FIG. 3) in the power delivery controlling process may be omitted so that the power controller 30 may proceed from S103 to S105 to conduct the device determining process. In this flow, the determination whether the power delivery to the external device 82 should be restricted or continued may be made more accurately.

Although examples of carrying out the invention has been described, those skilled in the art will appreciate that there are numerous variations and permutations of the image processing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the image processing apparatus may be a printer, a copier, a multifunction peripheral device, a scanner, and a facsimile machine, as long as the apparatus is equipped with a function to conduct an imaging process. The imaging process may include an image forming process, in which an image may be printed on a sheet, and an image reading process, in which an image on a sheet may be read.

For another example, when connection with the external device 82 is detected, and if the external device 82 is determined not to be under the power delivery restriction, the power controller 30 may not necessarily continue the power delivery to the external device 82 but may stop delivering the power to the external device 82 even if the external device 82 is not under the power delivery restriction. In particular, S207, S211, and S212 in the printing process (see FIG. 4) may be omitted; and when the request for power delivery from the connected external device 82 is accepted (S206: YES), the power controller 30 may proceed to S208. According to this flow, the image processing apparatus 100 may not deliver the power to the external device 82, from which no information concerning the condition of the power delivery is obtained, while an image is being processed. In this flow, the information indicating that the power delivery to the external device 82 has been restricted may be stored, and the restriction may be removed when the printing process is completed. If the power controller 30 starts delivering the power to the external device 82 while an image is being processed, quality of the image being processed may be lowered; therefore, the power delivery to the external device 82 may be restricted until the imaging process is completed and started when the imaging process is completed. Meanwhile, if the power is delivered to the external device 82 as long as the external device 82 is not under the power delivery restriction, the external device 82 may be provided to a user to be usable earlier.

For another example, when the external device 28 is under the power delivery restriction, the power to the external device 82 may not necessarily completely stopped but may be reduced to continue delivering the power within an extent that may not affect the quality of the image being processed notably. For example, in S202 in the printing process (see FIG. 4), the power controller 30 may send a command to the external device 82 to start negotiating once again over the power amount so that the power controller 30 and the external device 82 may agree with a smaller and affordable amount of the power to be delivered. Based on the agreement, the power controller 30 may deliver the smaller amount of power to the external device 82 in S203. Further, in S207, when the connected external device 82 is determined to be under the power delivery restriction (S207: YES), the power controller 30 may deliver a smaller amount of power to the external device 82. For example, in S208, the power controller 30 may negotiate over a profile with a smaller and affordable amount of the power with the external device 82. Based on the agreement with the external device 82, the power controller 30 may deliver the smaller amount of power to the external device 82.

For another example, the power delivery restriction may not necessarily be removed automatically upon completion of the imaging process but may be removed on basis of a user's command to release the external device 82 from the restriction.

For another example, the power controller 30 may not necessarily continue the power delivery to the external device 82 when the power amount requested from the external device 82 is smaller but may restrict the power delivery to the external device 82 regardless of the amount of the maximum power amount requested from the external device 82.

For another example, the power may not necessarily be delivered from the low-voltage power source 10 through the composite IC 20 to the USB interface 70 but may be delivered from the low-voltage power source 10 directly to the USB interface 70 without being transferred through the composite IC 20. In other words, while the power may be distributed to the image processing unit 40, the image processing controller 50, and the driving unit 60 through the composite IC 20, the power to the USB interface 70 may be supplied through a line, which connects the low-voltage power source 10 with the USB interface 70 and is separated from the power line between the low-voltage power source 10 and the composite IC 20. In this arrangement, the current detector 73 may detect values of the current flowing in the line connecting between the low-voltage power source 10 and the power pins of the connector 71.

The processes illustrated in the present disclosure may not necessarily be executed by a single CPU but may be executed by multiple CPUs, a hardware processor such as an ASIC, or a combination of any of these. Further, the processes may be provided in a form of a recording medium, which may store programs to implement the processes, and in other available methods.

What is claimed is:
1. An image processing apparatus, comprising:
an image processing unit configured to process an image;
a controller;
a power source; and
a USB interface comprising a connector and a current detector configured to detect current flowing in a power line, the connector being connectable with an external device, the power line connecting the connector with the power source,
wherein the controller is configured to:

start delivering power to the external device through the USB interface by controlling the power source in a case where connection with the external device through the connector is detected; and in a case where the controller receives a job requiring the image processing unit to process the image, and in a case where a difference between a smallest value and a largest value among current values detected by the current detector within a predetermined length of time while the power is delivered to the external device exceeds a threshold value, command the USB interface to restrict power delivery to the external device.

2. The image processing apparatus according to claim 1, wherein, in the case where the controller receives the job, and in the case where the difference between the smallest value and the largest value exceeds the threshold value, and after commanding the USB interface to restrict the power delivery to the external device, the controller is configured to command the USB interface to remove restriction of the power delivery to the external device after completion of processing of the image by the image processing unit.

3. The image processing apparatus according to claim 1, further comprising a memory device,
wherein, in the case where connection with the external device through the connector is detected, the controller is configured to receive identifying information of the external device through the connector;
wherein, in the case where the controller receives the job, and in the case where the difference between the smallest value and the largest value exceeds the threshold value, the controller is configured to store restriction information in association with the identifying information of the external device in the memory device; and
wherein, in the case where the controller receives the job, in the case where the difference between the smallest value and the largest value exceeds the threshold value, and in a case where the restriction information associated with the identifying information of the external device, to which the power is being delivered, is stored in the memory device, the controller is configured to command the USB interface to restrict the power delivery to the external device.

4. The image processing apparatus according to claim 3, wherein, in a case where the controller receives the identifying information through the connector, the controller is configured to determine whether the restriction information associated with the received identifying information is stored in the memory device;
wherein, in a case where the controller determines that the restriction information is not stored in the memory device, the controller is configured to store the restriction information in association with the identifying information of the external device in the memory device;
wherein, in a case where the controller determines that the restriction information is stored in the memory device, the controller is configured not to store the restriction information in association with the identifying information of the external device in the memory device.

5. The image processing apparatus according to claim 1, wherein, in the case where connection with the external device through the connector is detected, the controller is configured to receive power information indicating a maximum amount of the power requested by the external device from the external device through the connector and start delivering the power to the external device based on the power information.

6. The image processing apparatus according to claim 5, wherein, in a case where the maximum amount of the power requested by the external device is smaller than a threshold amount, the controller is configured to deliver the power to the external device regardless of the difference between the smallest value and the largest value.

7. The image processing apparatus according to claim 1, wherein, in a case where connection with the external device through the connector is detected while the image processing unit is processing the image, the controller is configured to restrict the power delivery to the external device until completion of processing of the image by the image processing unit, and, after completion of processing the image, the controller is configured to remove restriction of the power delivery to the external device and start delivering the power to the external device through the USB interface.

8. The image processing apparatus according to claim 1, wherein, in a case where connection with the external device through the connector is detected while the image processing unit is processing the image, and in the case where the difference between the smallest value and the largest value exceeds the threshold value, the controller is configured to restrict the power delivery to the external device until completion of processing of the image by the image processing unit, and, after completion of the processing of the image, remove restriction of the power delivery to the external device and start delivering the power to the external device through the USB interface; and
wherein, in the case where connection with the external device through the connector is detected while the image processing unit is processing the image, and in a case where the difference between the smallest value and the largest value does not exceed the threshold value, the controller is configured to start delivering the power to the external device through the USB interface without restricting the power delivery to the external device before completion of the processing of the image by the image processing unit.

9. The image processing apparatus according to claim 1, wherein processing of the image by the image processing unit includes forming an image on a sheet.

10. The image processing apparatus according to claim 1, wherein processing of the image by the image processing unit includes reading an image from an original.

11. An image processing apparatus, comprising:
an image processing unit configured to process an image;
a controller;
a power source; and
a USB interface comprising a connector and a current detector configured to detect current flowing in a power line, the connector being connectable with an external device, the power line connecting the connector with the power source,
wherein the controller is configured to:
start delivering power to the external device through the USB interface by controlling the power source in a case where connection with the external device through the connector is detected;
in a case where the controller receives a job requiring the image processing unit to process the image, count a number of times that a difference between a smallest value and a largest value among current values detected by the current detector within a predetermined length of time while the power is delivered to the external device exceeds a threshold number; and
in a case where the counted number exceeds the threshold number, command the USB interface to restrict power delivery to the external device.

* * * * *